United States Patent [19]
Werner

[11] Patent Number: 4,901,832
[45] Date of Patent: Feb. 20, 1990

[54] FREEWHEEL DRIVE FOR THE STARTER OF AN INTERNAL COMBUSTION ENGINE

[75] Inventor: André G. Werner, Jona, Switzerland

[73] Assignee: EEA Eastern Engineering Assoc. AG, Bremgarten, Switzerland

[21] Appl. No.: 224,916

[22] PCT Filed: Oct. 15, 1986

[86] PCT No.: PCT/CH86/00144
§ 371 Date: Jun. 14, 1988
§ 102(e) Date: Jun. 14, 1988

[87] PCT Pub. No.: WO88/02816
PCT Pub. Date: Apr. 21, 1988

[51] Int. Cl.[4] .............................................. F16D 16/00
[52] U.S. Cl. ........................................ 192/42; 142/45
[58] Field of Search ................................... 192/42, 45

[56] References Cited

U.S. PATENT DOCUMENTS

| | | | |
|---|---|---|---|
| 2,902,125 | 9/1959 | House et al. | 192/45 |
| 3,087,591 | 4/1963 | Whitney et al. | 192/45 |
| 3,247,727 | 4/1966 | Digby | 142/45 |
| 3,732,956 | 5/1973 | Johnson et al. | 142/45 |
| 3,972,573 | 8/1976 | Marola | 308/217 |
| 4,236,619 | 12/1980 | Kuroda | 142/45 |

FOREIGN PATENT DOCUMENTS

| | | |
|---|---|---|
| 3539360 | 5/1986 | Fed. Rep. of Germany . |
| 679949 | 4/1930 | France . |
| 1154767 | 4/1958 | France . |
| 2116957 | 7/1972 | France . |

OTHER PUBLICATIONS

Sauzedde, R. E. et al., "Design of Roller One-Way Clutches in Current Passenger Car Automatic Transmissions" in: Fischer, Harold, *Design Practices—Passenger Car Automatic Transmissions* (Warrendale, Pa., SAE, 1973), pp. 17-18.

Primary Examiner—Rodney H. Bonck
Assistant Examiner—Nicholas Whitelaw
Attorney, Agent, or Firm—Laurence R. Brown; Alfred J. Mangels

[57] ABSTRACT

The freewheel drive has an outer ring member which is integrally united with a sleeve for reception of the starter shaft, by way of a flange. This one-piece part forms a housing for the reception of the inner ring member, which is integrally connected with the driving pinion by way of a radially projecting flange. This integrally fabricated part has cam tracks extending eccentrically of the axis, on the outer peripheral surface of the inner ring member. Roller bodies under the bias of strap springs bear against the cam tracks and against the circular inner peripheral surface of the outer ring member. Each strap spring is held in a respective spring receptor of a ring-shaped spring guide. The latter is non-rotatably held against the inner ring member and bears against the flange. The advantage consists in the more economic manufacture of the inner ring member which has the cam tracks, and in the reliable functioning of the freewheel drive even under the most extreme loads.

6 Claims, 2 Drawing Sheets

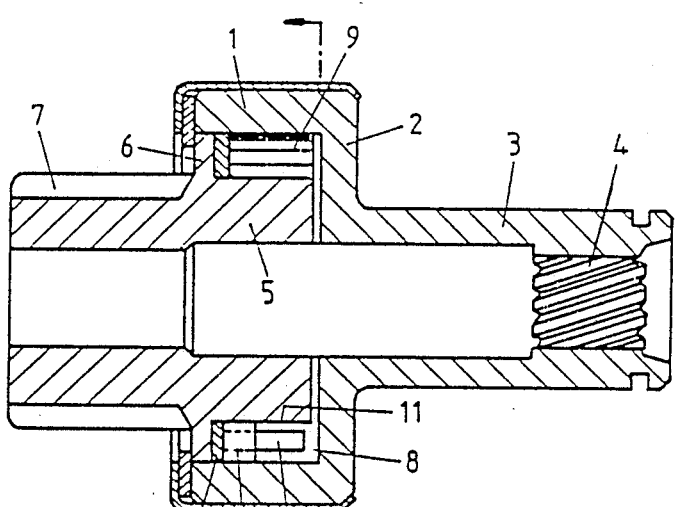
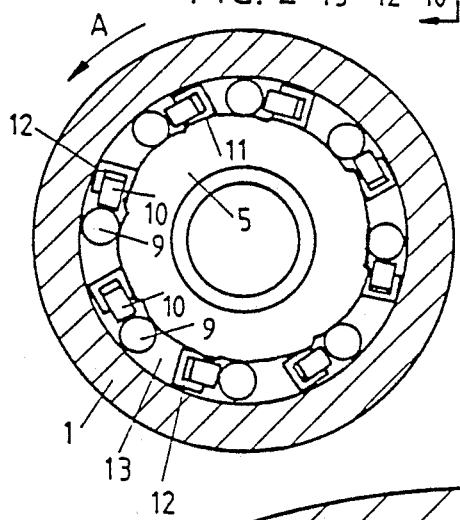
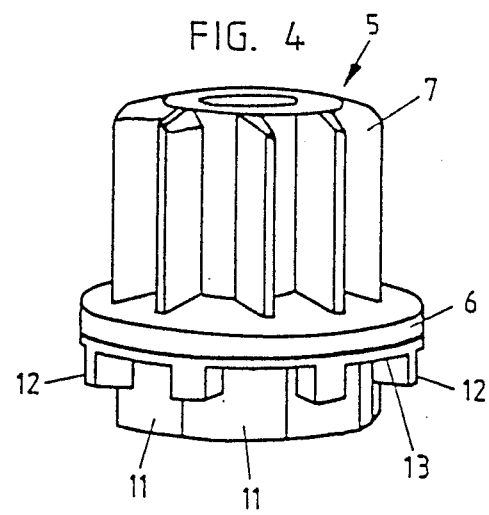
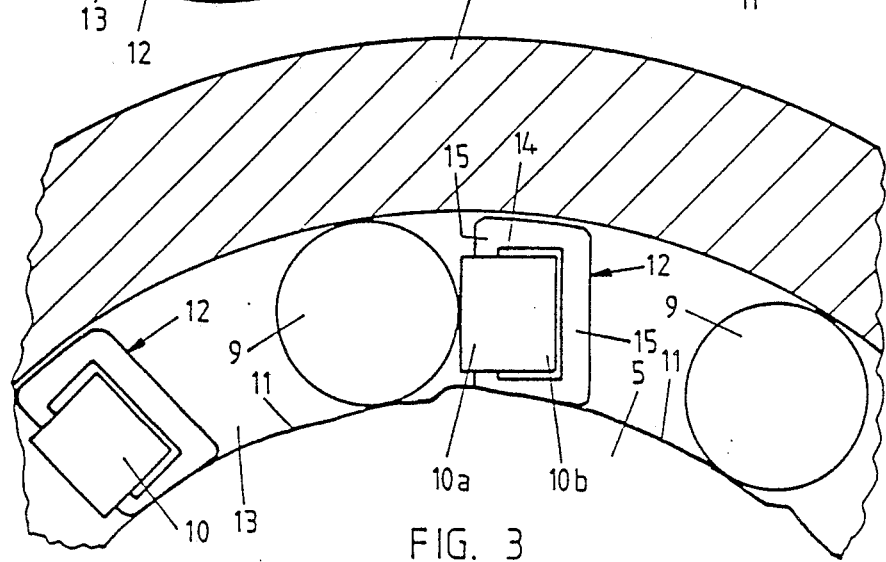

FREEWHEEL DRIVE FOR THE STARTER OF AN INTERNAL COMBUSTION ENGINE

BACKGROUND OF THE INVENTION

1. Field of the Invention

A freewheel drive for the starter of an internal combustion engine. This invention relates to a freewheel drive for the starter of an internal combustion engine, with ring members arranged coaxially to one another, and with roller bodies disposed between a circular peripheral surface of the first ring member and a peripheral surface of the second ring member which has cam tracks extending eccentrically of the axis. Each roller body is biased by an associated spring into a clamping position which permits relative movement of the ring members in one rotary direction only. The freewheel drive also comprises a driving pinion connected to one of the ring members, and a sleeve connected to the other ring member for the reception of a drive shaft.

2. Description of the Related Art

Known freewheel drives of this type have long been used as a part of the starter, especially for starting a mechanically propelled vehicle. In them, the sleeve which embraces the starter drive shaft is moved axially by means of a clutch relay, so that the driving pinion, located at the end of the freewheel drive remote from the sleeve, engages with the starter ring gear of the internal combustion engine. As soon as the internal combustion engine is caused to start, the driving pinion, having its teeth still engaged, must be able to carry forward with respect to the starter shaft, until the toothed engagement between the driving pinion and the ring gear of the engine is neutralised, for which reason this connection between the starter shaft and the engine ring gear is designed as a freewheel.

The freewheels used for this purpose always have roller bodies between a circular peripheral surface of a ring member and a peripheral surface of a further ring member having cam tracks extending eccentrically of the axis, which roller bodies act as clamps in one rotary direction of one or the other ring member, so that one ring member carries the other with it, while in the opposite direction of rotation, as a result of the freewheel effect which then arises, relative rotation of the ring members is possible. The actual direction of rotation can be right or left according to the design of the starter.

In a freewheel of this type the roller bodies consist of rollers, each biased into the clamping position by a respective spring. The springs must be held, and the plurality of springs and rollers must be mounted in the most practical manner, for which reason annular carriers with support elements for the springs have been designed in the most various forms.

Of the two ring members concentric to one another, the one whose peripheral surface has the cam tracks extending eccentrically of its axis was previously manufactured by milling with removal of swarf, and the outer ring member was always chosen, its inner peripheral surface being milled, until the time arrived when these members were manufactured by pressing or some other rational process. This outer ring member, in the freewheels of the above-described type, is integrally connected by means of a flange with the sleeve which serves for reception of the starter shaft. The component of one-piece design made in this way forms a housing for the reception of the inner ring member.

This housing with its inner peripheral surface having cam tracks extending eccentrically of the axis is also manufactured in the same manner as described above. The inner ring member with its integrally united driving pinion is likewise manufactured by cold flow pressing. As a variant on this kind of design, of course, the driving pinion could also be connected to the outer ring member by way of a flange, and the inner ring member could be connected with the sleeve for receiving the shaft of the starter.

The known freewheel drives of the above-described type sometimes fail when overloaded or when the ambient temperature is very low. In these cases the roller bodies no longer maintain the clamping action on the circular peripheral surface of the inner ring member, and thus the drive is ineffective. This disadvantage has the consequence that a powered vehicle equipped with this freewheel drive must be pushed or towed, unless in exceptional cases a starting handle is provided for starting the engine. The wear which arises is then a further disadvantage, or there is a total failure to function. A disadvantage in the known freewheel drives is that the manufacture of the profiled peripheral surface of the outer ring member with its axially eccentrically disposed cam tracks is costly from the tooling aspect, if one considers the less expensive possibility of machining the cam tracks into the inner ring member with its smaller diameter. Finally, in the known freewheel drives, special additional constructional elements are also provided, for effecting a lubricant-tight seal of the annular space which encloses the roller bodies and the springs.

SUMMARY OF THE INVENTION

The problem which underlies the present invention, therefore, in avoiding the above-recited disadvantages, is so to improve the freewheel drive that operational failure is ruled out. Another object pursued is the simplification of manufacture with view to the reduction of production costs.

The freewheel drive in accordance with the present invention solves this problem.

Series of tests carried out over a period of months have shown that the freewheel drive according to the invention always remains functionally efficient even under excessive loads and in low ambient temperatures, and is thus subjected to no wear caused by failure. The manufacture of a peripheral surface with cam tracks which extend eccentrically of the axis, on the inner ring member which has a smaller diameter, with the preferred technique of pressing, is simpler and more economical, not only as a manufacturing procedure but also in relation to the tool costs.

In the preferred embodiment the inner ring member is integrally united to the driving pinion by means of a flange, which flange closes off the annular space between the coaxial ring members, and serves for centering the inner ring member in the outer one. This has the advantage that the flange takes care of an optimal distribution of forces on the roller bodies because of its centering in the outer ring member, and that the annular space which encloses the roller bodies and the springs does not have to be covered off by an extra part.

The significant difference between a known freewheel drive and the drive according to the invention resides in the exchange of functions between the outer and the inner ring members, the latter, in the invented freewheel drive, now having the axially eccentric cam tracks on its outer peripheral surface, while the previously known freewheel drive has them on the outer ring member. The inventive idea of exchanging the functions rests on the insight that the inferior reliability of the prior known freewheel drive, especially in conditions of overload and low ambient temperature, is determined by the effects of the forces which arise, since the roller bodies are completely locked by clamping action against the inner profiled peripheral surface of the outer ring member, driven by the starting motor, and the torque arising there from a lever arm length corresponding to the diameter of the roller bodies intensifies the action of said forces on the smooth peripheral surface of the inner ring member in such a way that slipping becomes possible. In the freewheel drive according to the invention, the outer ring member is driven likewise, but possesses a smooth inner peripheral surface, against which the said slipping would have to take place, but the force intensification resulting from the lever action is missing, and the roller bodies are fast clamped against the profiled peripheral surface of the inner ring member.

BRIEF DESCRIPTION OF THE DRAWINGS

Further advantages and details of the invention can be realised from the following description and the drawings, in which an embodiment of the invented device is illustrated by way of example only. In the drawings;

FIG. 1 is an axial section through the freewheel drive;

FIG. 2 is a cross-section along the line 11—11 in FIG. 1;

FIG. 3 is a detail from FIG. 2 on a larger scale;

FIG. 4 is a pictorial representation of the part which consist of driving pinion, flange and inner ring member;

DESCRIPTION OF THE PREFERRED EMBODIMENTS

Figure 5:
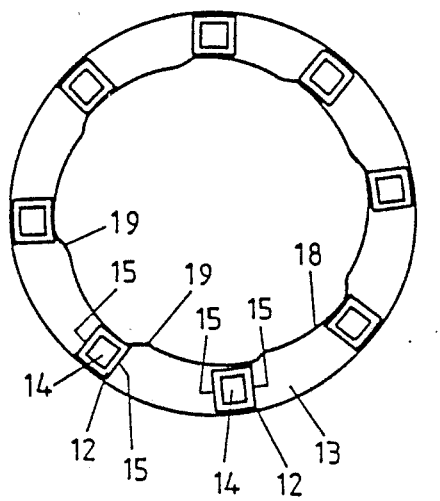
FIG. 5 is a plan view of the circular spring guide.

The freewheel drive according to FIG. 1 comprises an outer ring member 1 integrally united with a sleeve 3 by way of a flange 2, the sleeve having an internal helical toothing 4, so that the sleeve can execute an axial movement on a starting motor shaft (not illustrated) having a countertoothing. The outer ring member 1, the flange 2 and the sleeve 3 are integrally fabricated and constitute a housing for the reception of the inner ring member 5, which is arranged coaxially with the outer ring member 1. This inner ring member 5 is integrally united with the driving pinion 7 by way of a flange 6. This driving pinion 7 comes into engagement with a ring gear (not illustrated) of an internal combustion engine, when, on starting, the entire freewheel drive is displaced in the axial direction. The inner ring member 5, the flange 6 and the driving pinion 7 are fabricated integrally. The flange 6 serves for centering in the outer ring member 1, and simultaneously seals the annular space 8 between the outer ring member 1 and the inner ring member 5 from the exterior. Located in this annular space 8, and distributed at equal angles around its periphery there is arranged a number of roller bodies 9 designed as rollers, and an equal number of springs 10 which bias the roller bodies 9 into a position in which the clamping action is effective for traction of the inner ring member 5, when the outer ring member 1 is driven in the direction of the arrow A according to FIG. 2. The inner ring member 5, for this purpose, has cam tracks 11 on its outer periphery extending eccentrically of the axis, upon each of which a respective roller body 9 rolls, and comes into clamping contact when the outer ring member 1 turns in the rotary drive direction A.

Relative rotation of the two mutually coaxial ring members 1 and 5 is only possible in one direction, namely the inner ring member 5 can "overtake" the outer ring member 1 in the same drive direction A. This happens when the internal combustion engine has been started. At that moment the clamping contact is lost, and the roller bodies 9 roll back on the cam tracks, although the magnitude of the movement is minimal. The same freewheel effect would also come into play in the reverse conditions, if the inner ring member 5 were held fast and the outer ring member 1 rotated in the direction opposite to that of arrow A. Accordingly the functions of the parts of the freewheel drive could also be exchanged, whereby the driving pinion could be connected with the outer ring member and the sleeve with the inner one.

The number of cam tracks 11 extending eccentrically of the axis corresponds to the number of roller bodies 9 and the number of the springs 10, and this number naturally depends on the size or diameter of the freewheel drive. The more roller bodies are present, the better is the effectiveness of the freewheel, if one compares freewheel drives of equal diameter. The number of roller bodies to be accommodated depends on the amount of space needed for the springs. The screwed compression springs used in the known freewheel drives require a relatively large amount of space, and the most various securing devices have been developed for the arrangement of these springs in the circular or annular space; such devices, rather like the cages in a roller bearing, guarantee the mobility of the springs, and hold them fast so that they bear against the roller bodies at their centres.

In the freewheel drive according to the invention, strap springs 10, bent into a U-shape, are used, and require little space in the circumferential direction, so that it would be possible to house more roller bodies and associated springs in the annular space of the freewheel drive of the invention, than in known freewheel drives of the same diameter but having screwed compression springs.

Figure 8:
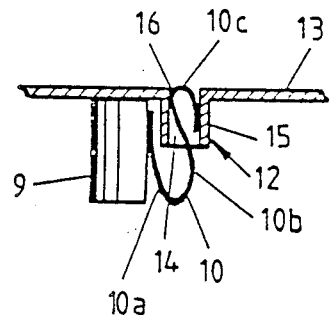
FIG. 8 is a detail of the spring guide with roller body and spring on a larger scale.

As can be seen from the illustrations on a larger scale according to FIG. 3 and 8, each strap spring 10, bent into a U-shape, has a limb 10a which bears against the roller body 9, while the other limb 10b is held fast in a spring receptor 12, designed integral with and projecting axially from a spring guide 13 constructed as a shallow ring. Each of these spring receptors 12, which are present in a number corresponding to the number of the roller bodies 9, consist of walls 15 projecting from the annular surface of the spring guide 13 and enclosing a rectangular hollow space 14. The limb 10b of the strap spring 10, bent back at its end, has its bent-back end part 10c held firmly clamped between the opposing walls 15 of the spring receptor 12. The hollow space 14 between the walls 15 of the spring receptor 12 adjoins a rectangular opening 16 of equal size in the spring guide 13 which is designed as a ring; the bent-back part 10c of the strap spring 10 extends as far as this opening 16 and thus is visible on the underside of the spring guide 13.

Figure 6:
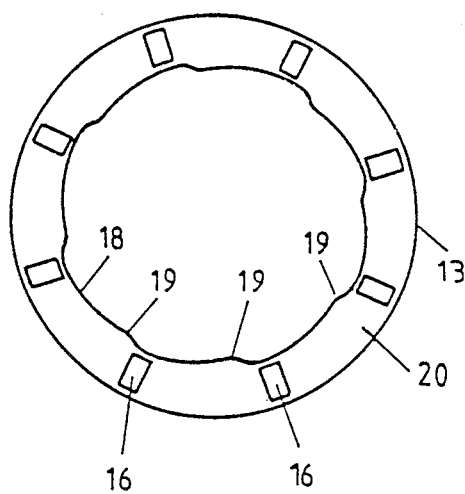
FIG. 6 is an underneath plan view of the spring guide.
Figure 7:
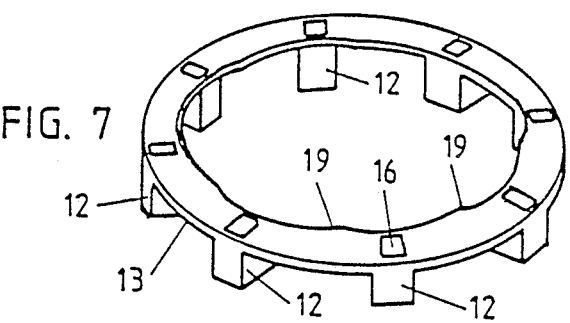
FIG. 7 is a pictorial representation of the spring guide.

This inner peripheral edge 18 is designed to correspond with the peripheral surface of the inner ring member 5 with its cam tracks 11 extending eccentrically of the axis, i.e., the inner peripheral edge 18 is provided with projections 19 corresponding with the cam tracks 11, whereby the annular spring guide 13 is secured against rotation with respect to the inner ring member 5. It (the surface 18) with its flat side 20 located opposite the spring receptors 12 and visible in FIG. 6, lies against the flange 6 which is present between the driving pinion 7 and the inner ring member 5.

The springs 10 can act not only by way of the limbs 10a which bear against the roller bodies, but also, thanks to their play in the hollow space 14 of the spring receptor 12, additionally by way of their limb 10b, and the spring force can be used as far as the inner edge of the walls 15 of the spring receptor 12, which depends on the spring pressure and on the diameter of the roller body.

The spring guide 13 with the spring receptors 12 is a one-piece plastics part. By the action of the springs 10, inset in the spring receptors, the roller bodies 9 are biased against the inner ring member 5 in the region where the cam track 11 begins to rise, and at the same time they are biased against the circular inner peripheral surface of the outer ring member 1, so that when the driven outer ring member 1 is rotated an immediate clamping contact ensues. In this the inner ring member 5 is the more heavily loaded.

I claim:

1. A freewheel drive for a starter of an internal combustion engine, said drive comprising: a pair of inner and outer ring members arranged coaxially to one another, the outer ring member having a circular inner peripheral surface positioned opposite an outer peripheral surface of the inner ring member, wherein the outer peripheral surface of the inner ring member includes a plurality of cam tracks, the cam tracks defined by arcs having respective arc centers that are each offset from the axis of the drive; a plurality of roller bodies disposed between the circular inner peripheral surface of the outer ring member and the outer peripheral surface of the inner ring member; spring members disposed between the inner and the outer ring members, each of said roller body being biased by an associated spring member into a clamping position which permits relative rotation of the ring members in one direction only; a driving pinion connected to one ring member; and a sleeve connected to the other ring member for reception of a drive shaft; wherein the inner ring member is integrally united with the driving pinion and includes an integrally formed flange, which integrally formed flange extends substantially radially to the inner peripheral surface of the outer ring member to close off one transverse end of an annular space defined between the mutually coaxial ring members and to center the inner ring member relative to the outer ring member.

2. A freewheel drive according to claim 1, wherein the inner ring member, the flange and the driving pinion form a single integrally fabricated workpiece.

3. A freewheel drive according to claim 1, wherein the outerring member is integrally united by way of a flange, with a sleeve for reception of a drive shaft, the outer ring member defining a housing having a circular interior peripheral surface which encloses the roller bodies and the inner ring member.

4. A freewheel drive according to claim 1, including a ring-shaped spring guide having an inner peripheral edge corresponding in size to the outer peripheral surface of the inner ring member, the spring guide being thereby secured against rotation with respect to the inner ring member, and wherein the spring guide has a flat face that abuts the integrally formed flange on the inner ring member and includes a plurality of spring receptors, the spring receptors extending substantially axially from a face of the spring guide opposite from the flat face.

5. A freewheel drive for a starter of an internal combustion engine, said drive comprising: a pair of inner and outer ring members arranged coaxially to one another, the outerring member having a circular inner peripheral surface positioned opposite an outer peripheral surface of the inner ring member, wherein the outer peripheral surface of the inner ring member includes a plurality of cam tracks, the cam tracks defined by arcs having respective arc centers that are each offset from the axis of the drive; a plurality of roller bodies disposed between the circular inner peripheral surface of the outer ring member and the outer peripheral surface of the inner ring member; spring members disposed between the inner and the outer ring members, each said roller body being biased by an associated spring member into a clamping position which permits relative rotation of the ring members in one direction only; a driving pinion connected to one ring member; a sleeve connected to the other ring member for reception of a drive shaft, wherein the inner ring member is integrally united with the driving pinion and includes an integrally formed positioning flange, which integrally formed positioning flange extends substantially radially to the inner peripheral surface of the outer ring member to close off one transverse end of an annular space defined between the mutually coaxial ring members and to center the inner ring member within the outer ring member, including spring receptors secured against rotation with respect to the inner ring member for carrying the respective spring members, wherein the spring members are strap springs bent into a U-shape defined by two limbs, of which one limb bears against a respective roller body, and the other limb is held in a spring receptor, and including a flat ring spring guide having an inner peripheral edge substantially corresponding in size to the outer peripheral surface of the inner ring member, the spring guide being thereby secured against rotation with respect to the inner ring member, and wherein the spring guide has a flat face that abuts the positioning flange on the inner ring member and includes a plurality of spring receptors that extend substantially axially from the opposite face of the spring guide from the face that abuts the positioning flange and that are equal in number to the of roller bodies present, said receptors being distributed at substantially equal angles around the periphery of the spring guide.

6. A freewheel drive according to claim 5, wherein each of the spring receptors on the ring-shaped spring guide includes a pair of laterally spaced, opposed walls which extend substantially axially and define therebetween a rectangular hollow space to receive one limb of the spring member which extends into the hollow space, wherein said one limb includes a backwardly bent part that is held clamped securely between the opposed walls of the spring receptor.

* * * * *